Dec. 30, 1952      P. R. BILLEY      2,623,410
VARIABLE-SPEED UNIT

Filed Nov. 30, 1949      3 Sheets—Sheet 1

Inventor.
Peter R. Billey
by Kenway, Jenney, Witter & Hildreth
Attys.

Dec. 30, 1952 P. R. BILLEY 2,623,410
VARIABLE-SPEED UNIT
Filed Nov. 30, 1949 3 Sheets—Sheet 2

Patented Dec. 30, 1952

2,623,410

UNITED STATES PATENT OFFICE 2,623,410

VARIABLE-SPEED UNIT

Peter R. Billey, Plymouth, Mass., assignor to Plymouth Cordage Company, North Plymouth, Mass., a corporation of Massachusetts Application November 30, 1949, Serial No. 130,203

3 Claims. (Cl. 74—689)

1

This invention comprises a new and improved variable speed unit characterized by a novel combination of differential gearing with a variable pitch V-belt drive.

Speed-changers of the V-belt type have been used with success for many years where multiple speed performance is required from machines having driving means restricted to a single or only a few fixed speeds. Such units are valuable in that they permit machines to be run at the exact speed best suited for the highest efficiency of different operations encountered from time to time under commercial conditions of manufacture. It is a fact, however, that such speed-changers are somewhat limited in their capacity or range as is evidenced by the fact that one of the foremost suppliers of such units lists thirteen different sizes of unit to take care of installations of 1 to 75 horsepower.

The principal object of the present invention is to increase the range and capacity of speed-changers of the V-belt type and to obtain from them greater output horsepower and torque than has been possible heretofore from other speed-changers available in the market using identical V-belts and sheaves, all without substantially increasing the overall size of the unit.

To this end an important feature of the invention consists in interposing between the input and output elements of the unit differential gearing so arranged that added horsepower and torque are transmitted directly from one element to the other in addition to the power transmitted through the V-belts. At high output speeds, when the V-belts can transmit only a small amount of torque, the major part of the torque is transmitted through the differential gearing. Conversely, at low output speeds when the V-belts are capable of transmitting high torque, the differential transmits the smaller portion thereof. This characteristic enables the unit to transmit comparatively high torque output over a wide range of speed.

These and other features of the invention will be best understood and appreciated from the following description of a preferred embodiment thereof, selected for purposes of illustration and shown in the accompanying drawings, in which.

Figure 1:
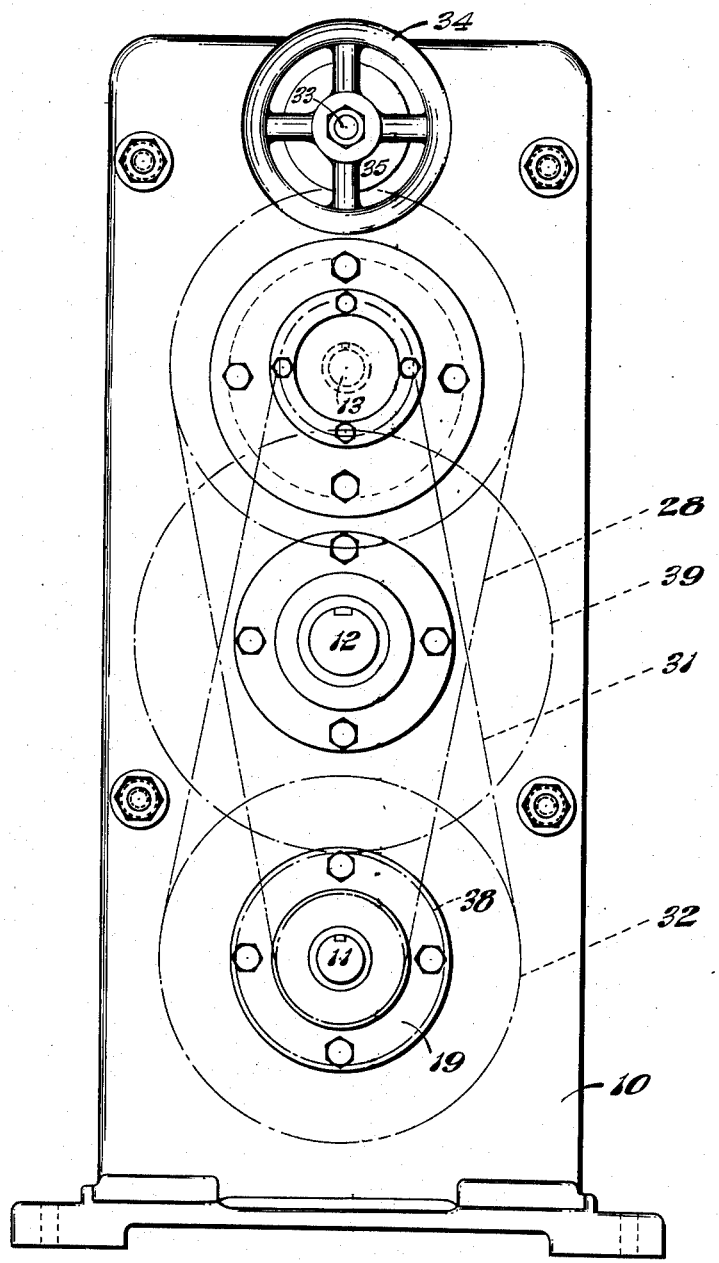
Fig. 1 is a view of the unit in side elevation.

In the accompanying drawings the operative mechanism of the unit is illustrated as mounted in a substantially rectangular box frame, and from this project the input and output shafts and the controlling means, herein shown as a hand wheel. It will be understood that the form of the frame or casing is of secondary importance from the standpoint of the present invention so long as it provides satisfactory and convenient support and bearings for the mechanism which will now be described.

In the frame 10 are mounted three parallel shafts, the input shaft 11, the output shaft 12, and a countershaft 13. A spider 14 is keyed to the input shaft 11 about midway between the sides of the frame. The right-hand portion of the shaft, as herein shown, carries a long sleeve or quill 15 which is supported at its outer end by ball bearings 16. The left-hand end of the shaft 11 carries a similar sleeve or quill 17 which is supported at its outer end by ball bearings 18, these bearings being enclosed within removable cover plates 19 and 20. The spider 14 as herein shown, has two arms upon one of which is rotatably mounted a beveled pinion 21, while the other carries a similar beveled pinion 22. These pinions mesh on one side with a beveled gear 23 fast on the sleeve 15, and on the other with the beveled gear 24 fast on the sleeve 17, and so constitute a differential gearing unit. This unit is enclosed in an oil-tight housing 25 through the side walls of which pass the sleeves 15 and 17.

The sleeve 17 carries an expansible V-belt pulley comprising the axially stationary flange 27 and the longitudinally movable flange 26 which has a splined connection with the sleeve. This pulley drives a V-belt 28 which, in turn, drives a similar pulley 29 keyed to the left end of the countershaft 13. Upon the right end of the shaft 13 is mounted another expansible driving V-belt pulley 30 and this pulley in turn drives a V-belt 31 which passes about an expansible pulley comprising an axially stationary flange 32 and a longitudinally movable flange 32' which has a splined connection with the sleeve 15.

Figure 2:
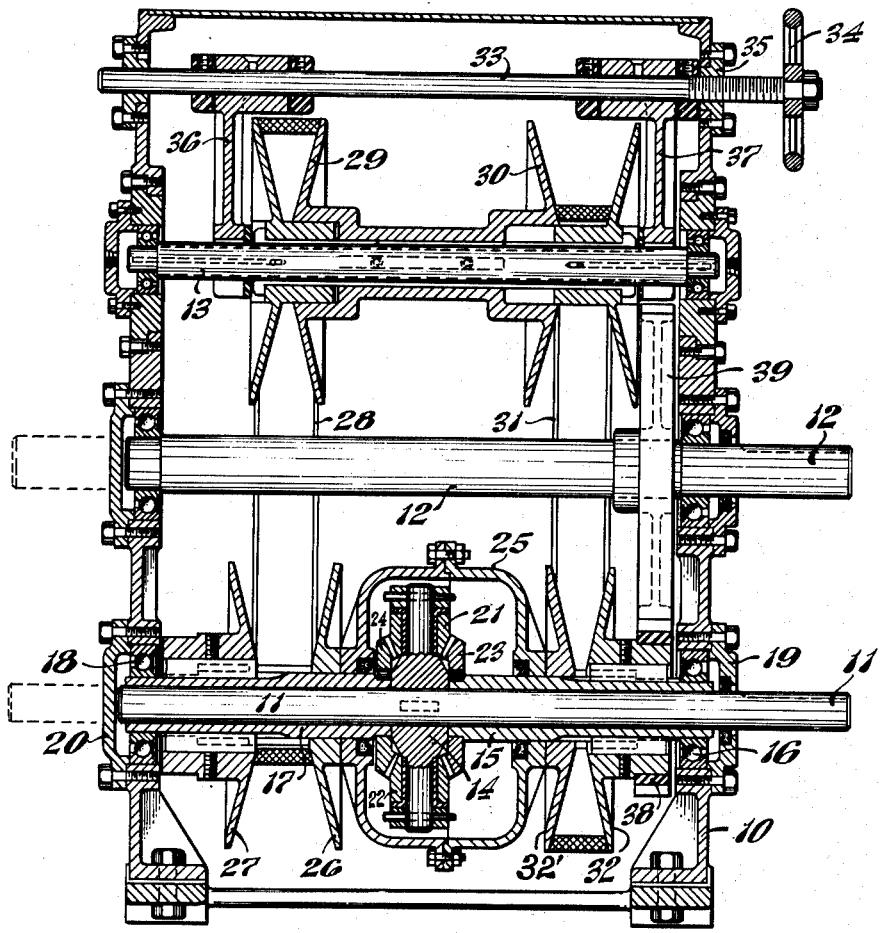
Fig. 2 is a view of the mechanism of the unit in front elevation with certain parts shown in section.

In the upper portion of the frame is mounted an adjusting shaft 33 threaded into a fixed nut 35 and arranged to be rotated by a hand wheel 34 for contracting or permitting expansion of the flanges of the V-belt pulleys 29 and 30 through the medium of arms 36 and 37 held between collars on the shaft. It will be seen that the inner flanges of these pulleys are fixed on the shaft 13 while their outer flanges are splined and longitudinally movable thereon. By this means the effective pitch diameter of the V-belt pulleys may be adjusted and controlled to vary the relative speed of the input shaft and the sleeve 15 throughout a range of 1 to 16, for example. In the position of adjustment shown in Fig. 2 the ratio is substantially 1 to 5 and this may be rapidly increased by moving the arms 36 and 37 toward the left by rotation of the hand wheel 34.

Power is transmitted from the sleeve 15 to the output shaft 12 through the medium of pinion 38 keyed to the outer hub of the V-belt pulley 32 and a large gear 39 fast on the output shaft 12 thus, with the differential unit, forming a geared connection between the input and output shafts. At the same time the two V-belts and their pulleys provide a belted driving connection between these same two elements. A characteristic feature in the drive mechanism of this invention is that a variable speed driving mechanism positively connects the outside gears of a differential unit for rotation in the same direction while the driven element (input shaft) includes the intermediate pinions of the differential unit, thus also driving the outside gears in the same direction but at different speeds.

Figure 3:
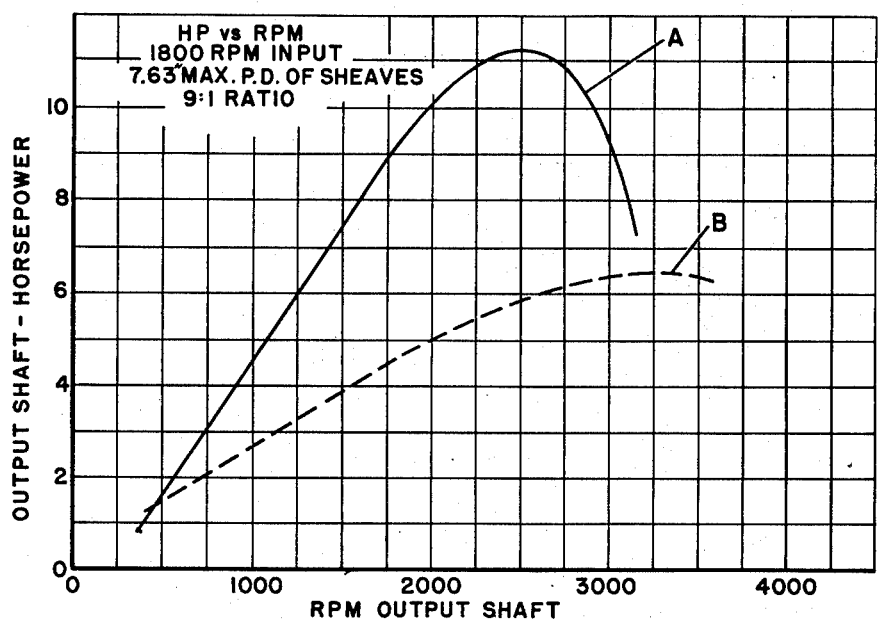
Figs. 3 and 4 are curves plotted to show output horsepower and torque in relation to output speed.
Figure 4:
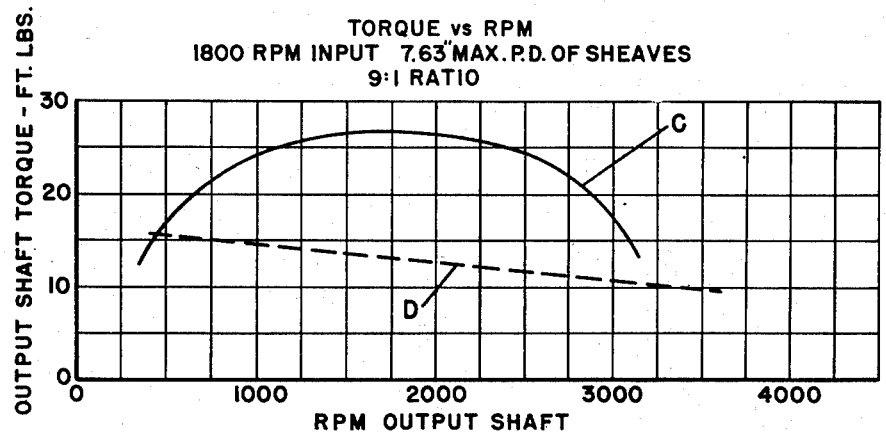

The curves of Figs. 3 and 4 graphically show the advantages of the mechanism of my invention as compared to that of a standard V-belt variable speed unit. In Fig. 3 the dotted curve B indicates actual performance of the latter at 1800 R. P. M. of the input shaft 11. As the R. P. M. of the output shaft 12 is varied from about 500 to 3500 the output horsepower rises to about 6.5. The full line curve A similarly indicates actual performance of the unit of this invention and shows that as the R. P. M. of the output shaft is varied from 500 to 2500 the output horsepower rises to more than 11.

In Fig. 4 the dotted line D indicates actual performance of the standard unit at 1800 R. P. M. of the input shaft and shows that as the R. P. M. of the output shaft is varied from about 500 to 3500 the torque of the output shaft falls from 15 to 10 foot pounds. On the other hand the full line curve shows that the unit herein disclosed transmits 27 foot pounds throughout a range of about 1250 to 2250 R. P. M. of the output shaft.

The housing 25 acts as a spacer between the two longitudinally movable V-pulley flanges 26 and 32' in addition to serving as an oil tight enclosure for the differential and is a running fit on the sleeve 15 and 17; hence, it is free to remain at rest or rotate at some indeterminate speed depending on the frictional drag of the rotating elements in contact with the housing.

The differential automatically takes up its share of the load and the magnitude of the torque transmitted by the differential depends on the position of the V-belts—this position being controlled by the arms 36 and 37.

No springs will be needed to maintain belt tension, as the arms 36 and 37 shift the splined and movable flanges on shaft 13, the housing 25 is forced over by increased tension on one belt and decreased tension on the other to a new position where the axial forces exerted by the belts are balanced and tensions are equal.

Having thus disclosed my invention and described in detail an illustrative embodiment thereof, I claim as new and desire to secure by Letters Patent:

1. In a variable speed unit comprising a frame, parallel input and output shafts mounted therein, a spider fast to the input shaft at an intermediate point, sleeves rotatable on the input shaft at either side of the spider, differential gearing between the spider and the two sleeves, and a geared connection between the output shaft and one of the sleeves on the input shaft, the improvement comprising a variable speed belt drive connecting the said sleeves for rotation in the same direction, said variable speed belt drive including an expansible V pulley on each of the sleeves, a countershaft parallel to the input and output shafts carrying a pair of corresponding V pulleys, V belts connecting the two sleeves each to the countershaft for rotation in the same direction, and means for adjusting the pitch diameter of the V pulleys for variable speed connection between the sleeves.

2. In a variable speed unit comprising a frame, parallel input and output shafts mounted therein, a spider fast to the input shaft at an intermediate point, sleeves roatable on the input shaft at either side of the spider, differential gearing between the spider and the two sleeves, and a geared connection between the output shaft and one of the sleeves on the input shaft, the improvement comprising a variable speed belt drive connecting the said sleeves for rotation in the same direction, said variable speed belt drive including an expansible V pulley comprising opposing cone sections on each of said sleeves, the outer cone sections being fixed and the inner cone sections being slidable on said sleeves, a countershaft parallel to said input and output shafts carrying a pair of corresponding V pulleys each comprising opposing cone sections, the inner cone sections being fixed and the outer cone sections being slidable on said countershaft, V belts connecting the two sleeves each to the countershafts for rotation in the same direction, adjusting means for positioning and maintaining a fixed spacing between the outer cone sections of the V pulleys on the countershaft, and spacing means slidably mounted on the input shaft adapted to maintain a fixed spacing between the inner cones of the V pulleys thereon.

3. Apparatus defined by claim 2 wherein the spacing means slidably mounted on the input shaft comprises an oil tight housing for the differential gearing between the spider and the two sleeves.

PETER R. BILLEY.

REFERENCES CITED

The following references are of record in the file of this patent:

UNITED STATES PATENTS

| Number | Name | Date |
|---|---|---|
| 625,541 | Gourgoulin et al. | June 26, 1900 |
| 1,702,627 | Bronander | Feb. 19, 1929 |
| 2,175,551 | Perry | Oct. 10, 1939 |
| 2,318,538 | Streich | May 4, 1943 |
| 2,364,325 | Stande et al. | Dec. 5, 1944 |
| 2,478,870 | Heyer | Aug. 9, 1949 |

FOREIGN PATENTS

| Number | Country | Date |
|---|---|---|
| 115,286 | Germany | Dec. 6, 1900 |
| 372,632 | Italy | July 5, 1939 |
| 460,692 | Great Britain | Feb. 2, 1937 |